(12) United States Patent
Devereaux

(10) Patent No.: US 6,357,091 B1
(45) Date of Patent: Mar. 19, 2002

(54) LATCH SENSING SEAT BELT BUCKLE

(75) Inventor: Scott D. Devereaux, Rochester, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/451,331

(22) Filed: Nov. 30, 1999

(51) Int. Cl.$^7$ ............................ A44B 11/26; B60R 21/00
(52) U.S. Cl. ............................ 24/633; 24/303; 24/603; 24/645
(58) Field of Search ........................ 24/633, 645, 303, 24/603

(56) References Cited

U.S. PATENT DOCUMENTS

| | | |
|---|---|---|
| 4,995,640 A | 2/1991 | Saito |
| 5,060,977 A * | 10/1991 | Saito ............................ 24/303 |
| 5,218,744 A | 6/1993 | Saito |
| 5,391,845 A | 2/1995 | Haas et al. |
| 5,406,252 A | 4/1995 | Dear |
| 5,742,986 A | 4/1998 | Corrion et al. |
| 5,752,299 A | 5/1998 | Vivacqua et al. |
| 5,781,971 A * | 7/1998 | Petersen, III ............ 24/633 |
| 5,839,174 A | 11/1998 | Chammings et al. |
| 5,898,366 A * | 4/1999 | Brown et al. ............. 24/633 |
| 5,907,892 A * | 6/1999 | Todd ........................... 24/645 |
| 5,966,784 A * | 10/1999 | Arbogast et al. ......... 24/633 |

* cited by examiner

*Primary Examiner*—Victor N. Sakran
(74) *Attorney, Agent, or Firm*—Tarolli, Sundheim, Covell, Tummino &Szabo L.L.P.

(57) ABSTRACT

An apparatus includes a lockable element (16) and a buckle (12). The buckle (12) includes a base (28) that defines a passage (32) into which the lockable element (16) is insertable, and a latch (42) movable to lock the lockable element against movement in the passage. The buckle (12) also includes a sensor (60) and a magnet (62). The magnet (62) is movable from a first position to a second position when the lockable element (16) is inserted into the passage (32). The magnet (62) creates a magnetic field of a first flux density acting on the sensor (60) to cause the sensor to provide a first output when the magnet is in the first position. The magnet (62) creates a magnetic field of a second flux density, different than the first flux density, acting on the sensor (60) to cause the sensor to provide a second output, different than the first output, when the magnet is in the second position. The magnet (62) has an interference fit with one of the lockable element (16) and the buckle (12).

12 Claims, 3 Drawing Sheets

LATCH SENSING SEAT BELT BUCKLE

FIELD OF THE INVENTION

The present invention relates to a seat belt buckle. In particular, the present invention relates to a seat belt buckle including a sensor for sensing when the buckle is in a latched condition.

BACKGROUND OF THE INVENTION

A seat belt system for restraining a vehicle occupant typically includes seat belt webbing, a lockable element on the webbing, and a seat belt buckle. The lockable element on the webbing is inserted in the buckle when the webbing has been placed about a vehicle occupant. A latch mechanism in the buckle interlocks with the lockable element to secure the webbing about the occupant. Such a seat belt system may also include a sensor for indicating whether or not the lockable element is locked in the buckle.

SUMMARY OF THE INVENTION

In accordance with the present invention, an apparatus comprises a lockable element and a buckle for receiving and locking the lockable element in the buckle. The buckle comprises a base defining a passage into which the lockable element is insertable in a first direction, and a latch moveable to lock the lockable element against movement in the passage.

The buckle also includes a sensor which provides an output signal, the magnitude of which is dependent upon the flux density of a magnetic field acting on the sensor. A magnet is movable from a first position to a second position when the lockable element is inserted into the buckle. The magnet creates a magnetic field of a first flux density that acts on the sensor to cause the sensor to provide a first output signal when the magnet is in the first position. The magnet creates a magnetic field of a second flux density, greater than the first flux density, when the magnet is in the second position to cause the sensor to provide a second output signal greater than the first output signal. The magnet has an interference fit with one of the lockable element and the buckle.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
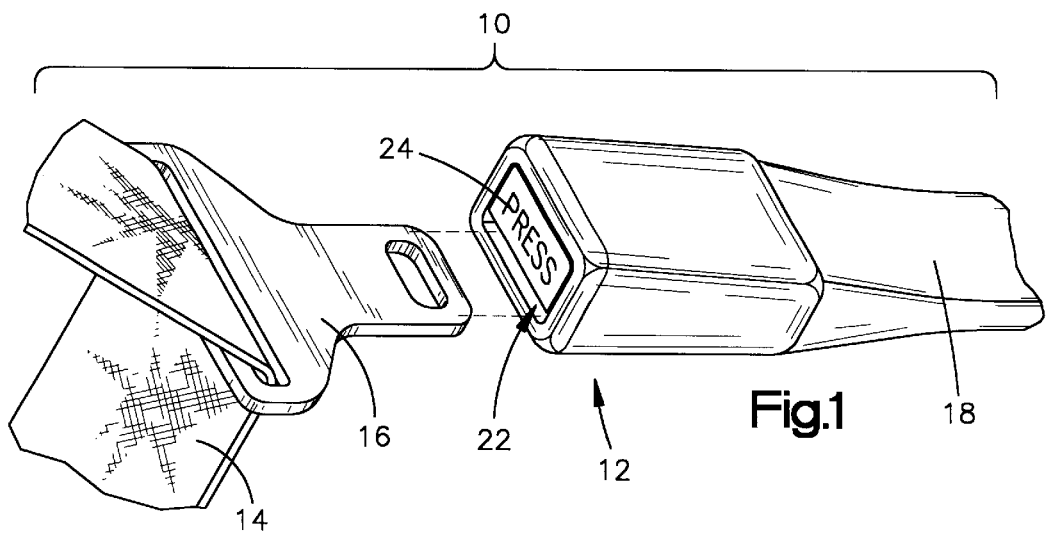
FIG. 1 is a perspective view of a vehicle occupant restraint apparatus comprising an embodiment of the present invention.

A vehicle occupant restraint apparatus 10 is shown in FIG. 1. The apparat us 10 includes a seat belt buckle 12, seat belt webbing 14, and a lockable element or tongue 16 on the webbing 14. The buckle 12 is anchored in a vehicle in a known manner, such as by a cable or anchor strap (not shown ) extending g within a cover 18. A latch mechanism 20 (shown schematically in FIG. 2) locks the lockable element 16 in the buckle 12 when the lockable element 16 is moved into an opening 22 at the end of the buckle 12. The lockable element 16 (FIG. 1) is subsequently released from the buckle 12 upon depression of a pushbutton 24 adjacent to the opening 22.

Figure 2:
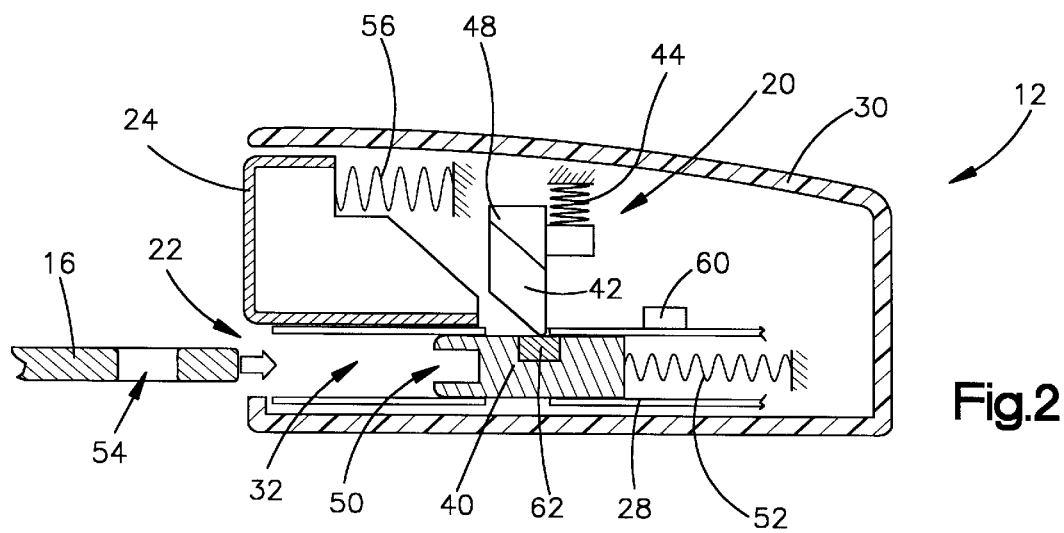
FIG. 2 is a side view, partly in section, of parts of the apparatus of FIG. 1, with certain parts being shown schematically.
Figure 3:
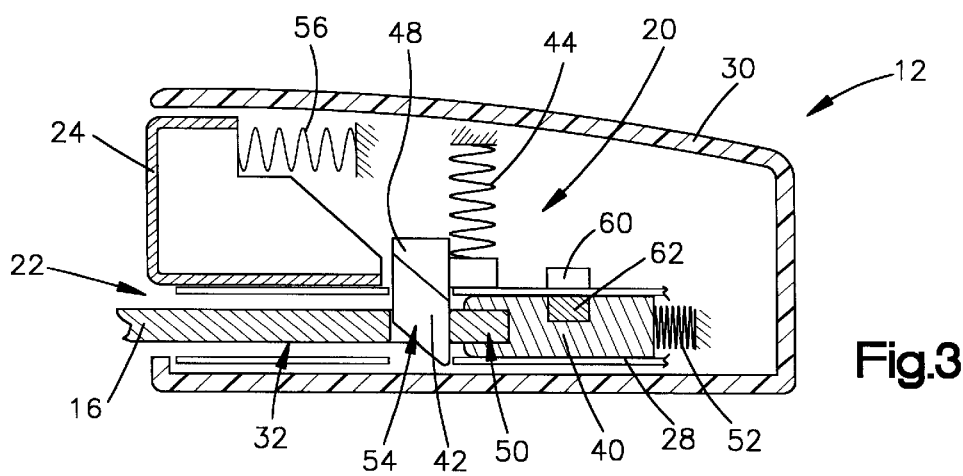
FIGS. 3 and 4 are views similar to FIG. 2 showing parts in different positions.
Figure 4:
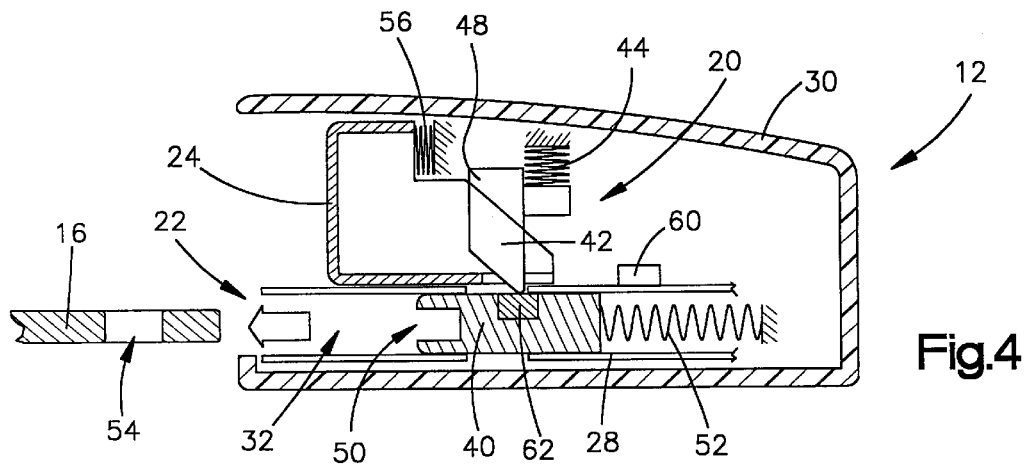

As shown in FIGS. 2–4, the buckle 12 includes a base 28 and a housing 30. The base 28 supports the latch mechanism 20 within the housing 30, and defines a passage 32 which receives the lockable element 16.

The latch mechanism 20 may comprise any suitable structure capable of releasably interlocking with the lockable element 16 in cooperation with the pushbutton 24. As shown by way of example in FIGS. 2–4, the latch mechanism 20 has a plurality of known parts including the pushbutton 24, an ejector 40, and a latch 42.

The latch 42 is movable between a non-locking position (FIG. 2) and a locking position (FIG. 3). A latch spring 44 engages the latch 42 and biases it toward the passage 32. The ejector 40 is movable within the passage 32. When the lockable element 16 is not in the passage 32, the ejector 40 is normally positioned to block movement of the latch 42 and hold the latch in the non-locking position against the bias of the latch spring 44.

When the lockable element 16 is inserted through the opening 22, as indicated by the arrow shown in FIG. 2, it is moved into engagement with the ejector 40 in a notch 50 at the end of the ejector 40. The lockable element 16 is then moved inward against the ejector 40 so as to push the ejector 40 along the passage 32 from a forward position (FIG. 2) to a rearward position (FIG. 3) against the bias of an ejector spring 52.

As the lockable element 16 and the ejector 40 approach the positions of FIG. 3, an aperture 54 in the lockable element 16 moves into alignment with the latch 42. The latch spring 44 then moves the latch 42 downward to the locking position through the aperture 54 in the lockable element 16 so that the latch 42 blocks removal of the lockable element 16 from the buckle 12.

When the lockable element 16 is to be released from the buckle 12, the pushbutton 24 is moved from the position of FIG. 3 to the position of FIG. 4 against the bias of a pushbutton spring 56. The pushbutton 24 engages, or may be linked with, the latch 42 in a known manner so as to move the latch 42 back out of the aperture 54 in the lockable element 16 against the bias of the latch spring 44. The ejector spring 52 then moves the ejector 40 back outward along the passage 32 toward the opening 22 to eject the lockable element 16 from the buckle 12 as shown by the arrow in FIG. 4.

Figure 5:
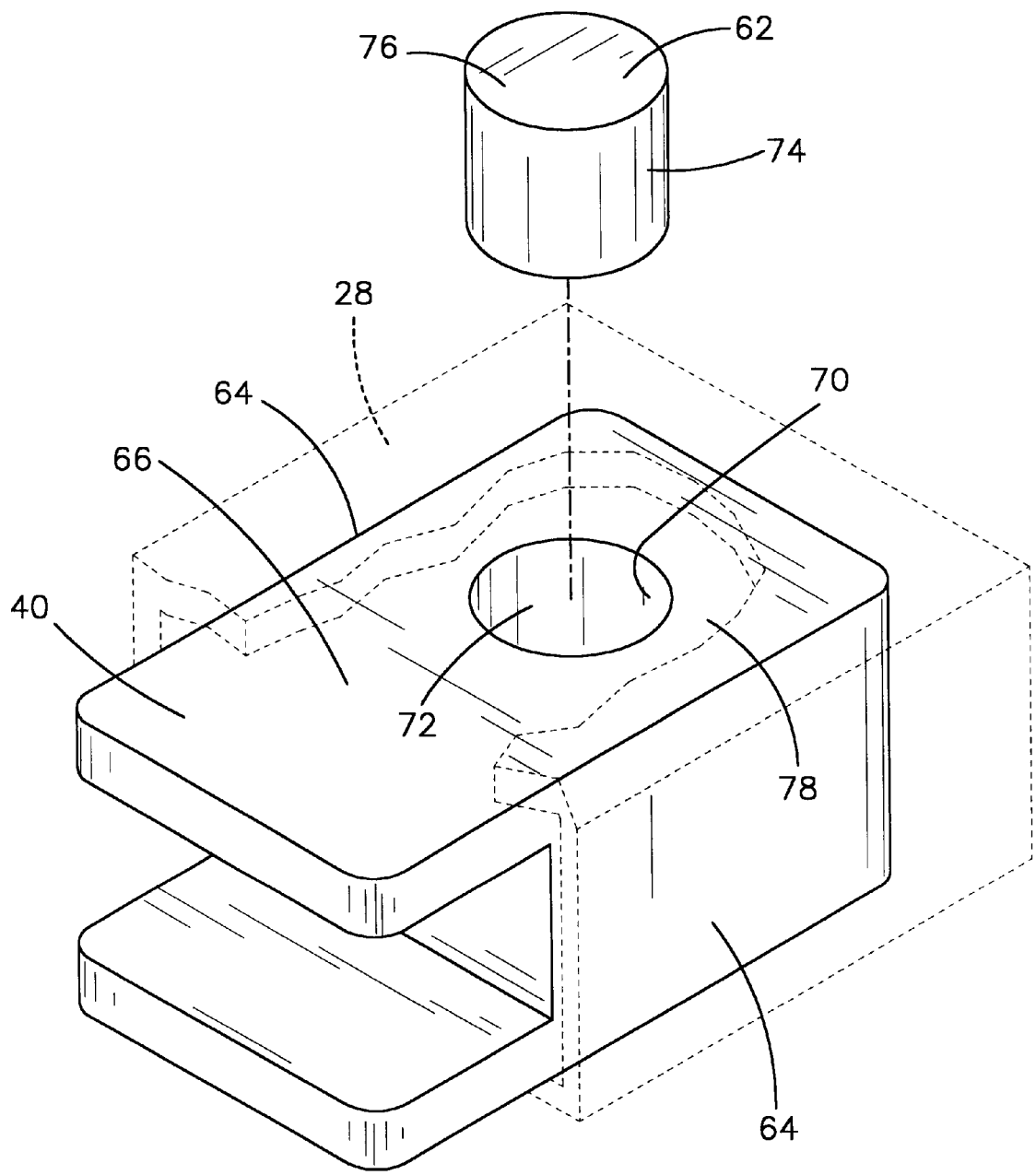
FIG. 5 is a perspective view of parts of the apparatus of FIG. 1.

The base 28 supports a sensor 60, such as a Hall effect device, within the housing 30. A magnet 62 is connected to the ejector 40. As illustrated in FIG. 5, the ejector 40 has a pair of guide portions 64 that engage the base 28. A central portion 66 of the ejector 40, located between the guide portions 64, includes a first cylindrically shaped surface 70 that defines a cylindrically shaped recess 72 having a first diameter. The magnet 62 has a smooth and uniform cylindrical shape, without projections, that forms a second cylindrically shaped surface 74. The second cylindrically shaped surface 74 has a second diameter that is greater than the first diameter.

The magnet 62 is insertable into the recess 72 such that the first cylindrical surface 70 is in abutting engagement with the second cylindrical surface 74. Thus, the magnet 62 has an interference fit with the ejector 40. The interference fit may be formed by press fitting the magnet 62 into the recess 72. The interference fit prevents the magnet 62 from dislodging from the ejector 40. When the magnet 62 is inserted into the ejector 40, a flat end surface 76 (FIGS. 6–7) of the magnet is positioned flush with a surface 78 of the central portion 66 of the ejector 40.

The magnet 62 is a permanent magnet made of metal, and the ejector 40 is made of plastic. It will be recognized by those skilled in the art, however, that the magnet 62 and the ejector 40 may be made of alternative materials. Also, the apparatus 10 may have alternative constructions in which the magnet 62 may be connected to the lockable element 16 or to other components of the buckle 12. For example, the magnet 62 may have an interference fit with the lockable element 16 or the latch 42. In this instance, the second cylindrical surface 70 would define the recess 72 in the lockable element 16 or the latch 42, respectively.

When the lockable element 16 is in the non-locking position of FIG. 2, the magnet 62 is in a first position spaced apart from the sensor 60. This is best shown in the enlarged view of FIG. 6. In the non-locking position, a magnetic field, which is conducted between north and south poles 80 and 82 of the magnet 62, is spaced away from the sensor 60. Thus, a magnetic field of a first flux density acts on the sensor 60 when the latch 42 is in the non-locking position. This magnetic field is indicated generally by the dashed lines in FIG. 6. The first flux density of the magnetic field acting on the sensor 60 may be zero. As a result, the sensor 60 has a low (or off) condition with a corresponding output when the lockable element 16 is not locked in the buckle 12.

As the lockable element 16 is inserted into the passage 32, the magnet 62 moves from the first position of FIG. 2 towards the second position illustrated in FIG. 3. When the aperture 54 in the lockable element 16 becomes aligned with the latch 42, the latch 42 moves to the locking position of FIG. 3 and the magnet 62 is maintained in the second position, spaced close to the sensor 60. This is best shown in the enlarged view of FIG. 7.

Figure 7:
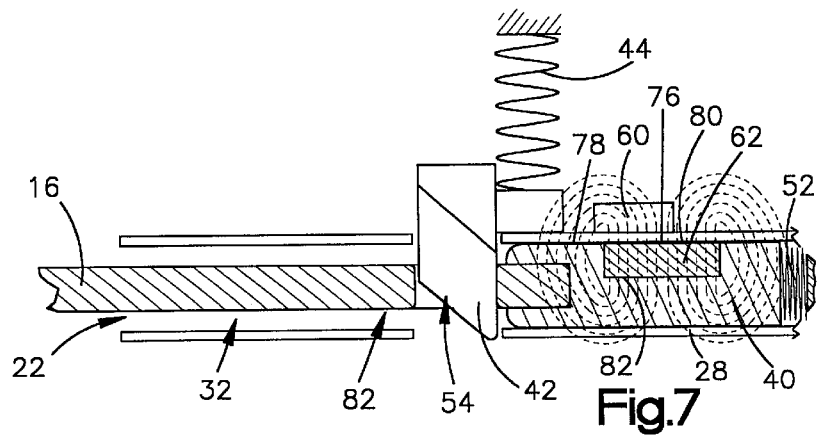
FIG. 7 is a view similar to FIG. 5 showing parts in different positions.

When the parts are in the position shown in FIG. 7, the magnetic field conducted between the north and south poles 80 and 82 of the magnet 62 is spaced close to the sensor 60. Thus, a magnetic field of a second flux density, different than the first flux density, acts on the sensor 60 when the lockable element 16 is locked in the buckle 12. This magnetic field is indicated generally by the dashed lines shown in FIG. 7.

The sensor 60 is thus switched from a first condition with a first output to a second, different condition with a correspondingly different output upon locking of the lockable element 16 in the buckle 12 by the latch 42.

Figure 6:
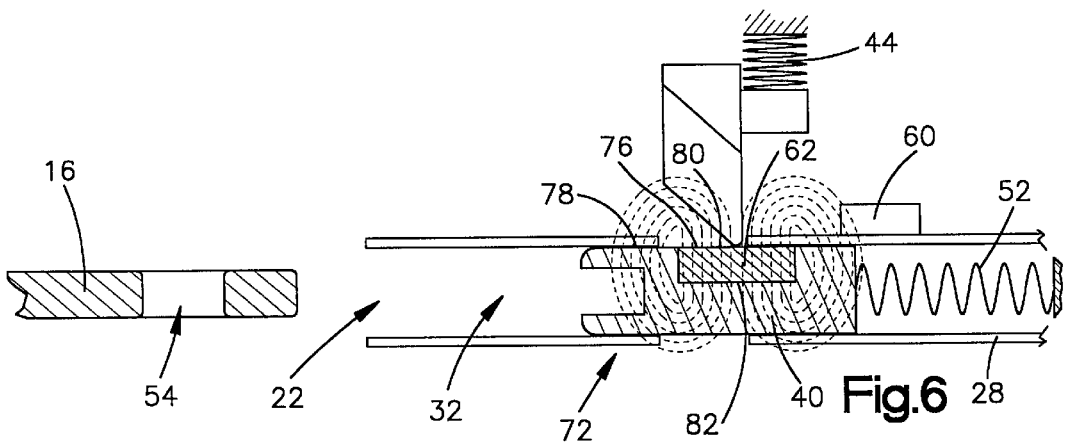
FIG. 6 is an enlarged schematic view of parts shown in FIG. 2.

In the illustrated embodiment, the second flux density of the magnetic field acting on the sensor 60 is greater than the first flux density. It will be recognized by those skilled in the art, however, that the magnet 62 and/or the sensor 60 may be arranged such that the first flux density is greater than the second flux density. For example, the magnet 62 may be connected to the ejector 42 at a location on the ejector such that the magnet is located adjacent to the sensor 60 when the magnet is in the first position (FIG. 6). As the magnet 62 moves to the second position (FIG. 7), the magnet would become spaced away from the sensor 60.

The sensor 60 can be used to alert a vehicle occupant to the locked or unlocked condition of the lockable element 16 and buckle 12. For example, an audible alarm or a lamp on the vehicle instrument panel could be activated in response to the output of the sensor 60 to alert a vehicle occupant if the lockable element 16 is not locked in the buckle 12.

The sensor 60 can also be used to control one or more vehicle occupant protection devices. For example, the sensor 60 can be included in a deployment system with an inflatable vehicle occupant protection device. The sensor 60 can be used to control the inflation of the protection device depending upon the buckled or unbuckled condition of the seat belt. The inflatable device can be any one of several different types of inflatable vehicle occupant protection devices known in the art. Such inflatable devices include air bags, inflatable seat belts, inflatable knee bolsters, inflatable head liners, inflatable side curtains, and knee bolsters operated by air bags, and/or seat belt pretensioners.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a lockable element and a buckle for receiving and locking said lockable element in said buckle, said buckle comprising:
   a base defining a passage into which the lockable element is insertable in a first direction;
   a latch moveable to lock said lockable element against movement in said passage;
   a sensor for sensing a magnetic field, said sensor providing an output signal, the magnitude of which is dependent upon the flux density of a magnetic field acting on said sensor; and
   a magnet that is movable from a first position to a second position when said lockable element is inserted into said passage, said magnet creating a magnetic field of a first flux density acting on said sensor to cause said sensor to provide a first output signal when said magnet is in said first position;
   said magnet creating a magnetic field of a second flux density that acts on said sensor, different than said first flux density, when said magnet is in said second position to cause said sensor to provide a second output signal different than said first output signal;
   said magnet having an interference fit with one of said lockable element and said buckle, said one of said lockable element and said buckle including a first surface defining a shaped recess with a first length, said magnet having a second surface with a second length larger than said first length, said first and second surfaces being in abutting engagement and providing said interference fit.

2. Apparatus as defined in claim 1 wherein said sensor comprises a Hall effect device.

3. Apparatus as defined in claim 1 wherein said first flux density is zero.

4. Apparatus as defined in claim 1 wherein said second flux density is greater than said first flux density.

5. Apparatus comprising:
   a lockable element and a buckle for receiving and locking said lockable element in said buckle, said buckle comprising:
   a base defining a passage into which the lockable element is insertable in a first direction;
   a latch moveable to lock said lockable element against movement in said passage;

a sensor for sensing a magnetic field, said sensor providing an output signal, the magnitude of which is dependent upon the flux density of a magnetic field acting on said sensor; and a magnet that is movable from a first position to a second position when said lockable element is inserted into said passage, said magnet creating a magnetic field of a first flux density acting on said sensor to cause said sensor to provide a first output signal when said magnet is in said first position;

said magnet creating a magnetic field of a second flux density that acts on said sensor, different than said first flux density, when said magnet is in said second position to cause said sensor to provide a second output signal different than said first output signal;

said magnet having an interference fit with one of said lockable element and said buckle, said one of said lockable element and said buckle including a first cylindrical surface defining a cylindrically shaped recess having a first diameter, and said magnet having a second cylindrical surface of a second diameter, greater than said first diameter, said first and second cylindrical surfaces being in abutting engagement and providing said interference fit.

6. Apparatus as defined in claim 5 wherein said magnet has a substantially uniform cylindrical shape, said second cylindrical surface being generally smooth and without projections.

7. Apparatus as defined in claim 5 wherein said magnet is press fitted into said cylindrically shaped recess.

8. Apparatus comprising:

a lockable element and a buckle for receiving and locking said lockable element in said buckle, said buckle comprising:

a base defining a passage into which the lockable element is insertable in a first direction;

a latch moveable to lock said lockable element against movement in said passage;

a sensor for sensing a magnetic field, said sensor providing an output signal, the magnitude of which is dependent upon the flux density of a magnetic field acting on said sensor;

an ejector movable within said passage; and a magnet that is movable from a first position to a second position when said lockable element is inserted into said passage, said magnet creating a magnetic field of a first flux density acting on said sensor to cause said sensor to provide a first output signal when said magnet is in said first position;

said magnet creating a magnetic field of a second flux density that acts on said sensor, different than said first flux density, when said magnet is in said second position to cause said sensor to provide a second output signal different than said first output signal;

said magnet having an interference fit with one of said lockable element and said buckle, said ejector having a pair of guide portions engageable with said base and a central portion located between said guide portions, said central portion having a first cylindrical surface defining a cylindrically shaped recess having a first diameter, and said magnet having a second cylindrical surface of a second diameter, greater than said first diameter, said first and second cylindrical surfaces being in abutting engagement and providing said interference fit.

9. Apparatus as defined in claim 8 wherein said magnet is a permanent magnet made of metal and said ejector is made of plastic.

10. Apparatus as defined in claim 8 wherein said magnet has a flat end surface positioned flush with said central portion of said ejector.

11. Apparatus as defined in claim 8 wherein said magnet has a substantially uniform cylindrical shape, said second cylindrical surface being generally smooth and without projections.

12. Apparatus as defined in claim 8 wherein said magnet is press fitted into said cylindrically shaped recess.

* * * * *